(12) United States Patent
Müller et al.

(10) Patent No.: US 7,695,070 B2
(45) Date of Patent: Apr. 13, 2010

(54) RETAINING SYSTEM

(75) Inventors: Alfred Müller, Gröbenzell (DE); Robert Gettert, Fürstenfeldbruck (DE)

(73) Assignee: Maurer Sohne GmbH & Co. KG, Munich (DE)

( * ) Notice: Subject to any disclaimer, the term of this patent is extended or adjusted under 35 U.S.C. 154(b) by 202 days.

(21) Appl. No.: 10/650,984

(22) Filed: Aug. 29, 2003

(65) Prior Publication Data

US 2005/0275275 A1 Dec. 15, 2005

(30) Foreign Application Priority Data

Aug. 29, 2002 (DE) .................. 102 39 891
Aug. 20, 2003 (EP) .................. 03018943

(51) Int. Cl.
*A62B 35/00* (2006.01)
*A63G 1/34* (2006.01)

(52) U.S. Cl. ....................... 297/467; 297/487
(58) Field of Classification Search ................ 297/467, 297/487, 256.15; 104/53
See application file for complete search history.

(56) References Cited

U.S. PATENT DOCUMENTS

| 2,592,879 | A | * | 4/1952 | Eyerly | 297/487 |
|---|---|---|---|---|---|
| 2,851,084 | A | * | 9/1958 | Benjetsky | 297/254 |
| 3,453,026 | A | * | 7/1969 | Paes et al. | 297/487 |
| 3,476,385 | A | | 11/1969 | Foy | |
| 3,637,259 | A | * | 1/1972 | Rothschild | 180/270 |
| 3,917,342 | A | * | 11/1975 | Furuta | 297/468 |
| 3,948,556 | A | * | 4/1976 | Hyde et al. | 297/256.13 |
| 4,036,489 | A | * | 7/1977 | Potyondy | 472/44 |
| 4,186,961 | A | * | 2/1980 | Farrell et al. | 297/256.1 |
| 4,213,651 | A | * | 7/1980 | Yoshitsugu et al. | 297/475 |
| 5,129,478 | A | * | 7/1992 | Suenaga et al. | 180/268 |
| 5,286,091 | A | * | 2/1994 | Busch | 297/487 |
| 5,476,309 | A | | 12/1995 | Chen | |
| 5,507,558 | A | * | 4/1996 | Kain | 297/256.15 |
| 5,586,503 | A | * | 12/1996 | Rehorn | 104/241 |
| 6,234,525 | B1 | * | 5/2001 | Schroder et al. | 280/748 |
| 2006/0202542 | A1 | * | 9/2006 | Pribonic | 297/467 |

FOREIGN PATENT DOCUMENTS

CH 555 250 10/1974

(Continued)

*Primary Examiner*—Joseph F Edell
(74) *Attorney, Agent, or Firm*—Birch, Stewart, Kolasch & Birch, LLP.

(57) ABSTRACT

A retaining system for amusement rides, more particularly roller coasters, carrousels or the like has a chair member for a passenger to sit on and which comprises a seat and a back rest and furthermore a retaining device with at least one locking part able to be moved between at least one getting on position and at least one retaining position, the retaining device possessing an essentially U-like retaining part, which at least to a major extent surrounds the pelvic region of the passenger to be secured, the retaining part being inclined in an anthropometrically optimized plane, which is inclined in a range of 30° to 60°, more particularly 40° to 50°, preferably approximately 45° to the horizontal and/or the seat. Furthermore the present invention relates to a measuring system for determination of the optimum locking position, the measuring system comprising a band- or cable-like element 8 arranged at the ends of the U-like retaining part, which element on applying the retaining device to the passenger to be secured engages the passenger to be secured rendering it possible to ascertain the locking or retaining position of the retaining device or, respectively, of the retaining part.

20 Claims, 16 Drawing Sheets

FOREIGN PATENT DOCUMENTS

| | | |
|---|---|---|
| DE | 24 28 285 A1 | 1/1976 |
| DE | 32 37 684 C2 | 4/1983 |
| DE | 299 21 832 U1 | 4/2000 |
| DE | 100 16 213 C1 | 10/2001 |
| DE | 698 05 091 T2 | 12/2002 |
| EP | 0 875 423 A2 | 11/1998 |
| EP | 1 245 459 A1 | 10/2002 |
| GB | 1 245 452 | 9/1971 |
| GB | 1 189 985 | 11/1996 |
| WO | WO-99/22830 A1 | 5/1999 |

\* cited by examiner

RETAINING SYSTEM

BACKGROUND OF THE INVENTION

This nonprovisional application claims priority under 35 U.S.C. § 119(a) on Patent Application No(s) .102 39 891.7 filed in Germany on Aug. 29, 2002 and 03 018 943.5 filed in Europe on Aug. 20, 2003, which is(are) herein incorporated by reference.

The invention relates to a retaining system, more particularly for persons subjected to dynamic movements such as acceleration, retarding and/or swinging and rotary movements of conveying means, more particularly vehicles and/or working platforms, comprising a chair member for use by such person, said chair member having a seat and a back rest, and furthermore a retaining device having a locking means able to be moved between at least one getting on position and at least one retaining position. The conveying means may be terrestrial, aquatic and/or aerial means of transportation, with which persons may be conveyed while seated. The persons are then subject to dynamic forces and must be secured to prevent falling off or falling down. The invention furthermore relates to conveyor cages, working baskets and securing means with which persons can be conveyed to and from a work site or with which they may assume different positions.

Rail-bound vehicles are for example employed on fairgrounds, playgrounds and other festivities in many different types of rides for the amusement of patrons. These amusement rides such as roller coasters, big dippers, merry-go-rounds and the like mean that the bodies of the passengers are dashed about hither and thither and so subjected to accelerating and retarding forces and also to changes in the direction of motion and unexpected loads, something which on the one hand exhilarates but on the other hand involves the danger of accidents, for example owing to passengers being thrown off the amusement ride.

For these reasons it is known to provide such amusement rides involving high speeds, substantial accelerations and retardations with suitable restraining systems. These restraining systems must comply with a plurality of partly incompatible requirements. Thus on the one hand they are to provide for enhanced safety while on the other hand they are to be simply and rapidly operated. Moreover, they should give the passengers sufficient freedom of movement while on the other hand prevent unconscious or suicidally minded passengers from being thrown from the amusement ride vehicles. Accordingly even with the known restraining systems improvements of such systems are called for.

SUMMARY OF THE INVENTION

Hence one object of the present invention is to create a restraining system which is simple in structure, may be rapidly and reliably operated and at the same time offers optimum safety together with sufficient and maximum freedom of movement for the passengers. Furthermore, the safety of the passengers is to be able to be expediently and efficiently checked by the amusement ride attendants.

The restraining system in accordance with the invention is characterized in accordance with a first aspect in that it may be substantially limited to the pelvic region of the passenger to be secured. Although, naturally, retaining systems for the pelvic region of the passenger to be secured are already known, extensive investigations of the inventors have indicated that it is of critical importance that an essentially U-like retaining part be provided which surrounds the major part of the pelvic region of the passenger to be secured, such U-like retaining part being arranged in a retaining plane which is anthropometrically optimized. It has been determined in this respect that the anthropometrically optimized retaining plane in the case of a vehicle in the position ready for getting on and off is inclined at an angle of 300 to 60° (in the following, degree data is always related to the vehicle in the position ready for getting on and off), more particularly 40° to 50°, preferably approximately 45° or 500 and more specifically 44.6° to the horizontal, the seat being able to be inclined at 0° to 30° and preferably 25° to the horizontal so that there may be a different inclination For the seat to the anthropometric plane, more particularly of approximately 20° to 25°. In the determination of the anthropometrically favorable plane it is however always necessary to take into account the particulars of the amusement ride, since more especially the type of movements, the arrangement of the chair members and the arrangement of the back rest at preferably 70° to 75° and more particularly 85° to the seat play a role. The optimum anthropometric retaining plane of 45° to 50° and more particularly 44.6 to the horizontal plane is in any case to be selected if the seat is also horizontally aligned. If the seat is arranged with an inclination of the horizontal, an alignment of the retaining plane on the basis of the seat, that is to say an additional positive or negative inclination to the horizontal, may be required. Since during amusement rides the passengers are however normally moved with very different alignments or orientations, involving for example somersaults or the like, alignment of the anthropometric retaining plane with the horizontal is preferred. A substantially U-like retaining part arranged in accordance with the optimum anthropometric plane will lead to the advantage that in the case of emergency the entire weight of the passenger to be secured may be supported by way of a non-problematical region of the passenger's body and that in all possible directions, at which the passenger might be moved away from the chair member, he is secured in an optimum manner. Furthermore in the retaining plane indicated neither corpulent thighs nor protruding abdomens will obstruct the locking and retaining operation.

Since the retaining device must be released for the passenger to get on and off the chair member, at least one locking part must be provided so that the retaining device may assume a getting and a getting off position. In the present description the term locking part is therefore to be understood as the part of the retaining device, which may be shifted for the passenger to get on. Accordingly on the other hand the retaining part is, in accordance with the definition to be employed in the following, that part of the retaining device, which in an emergency is employed for restraining the passenger, that is to say contributes to taking up the forces. Since both the retaining part and also the locking part may be multi-part in design and in some circumstances may comprise completely identical or identical parts, the difference between retaining part and locking part in the case of the retaining device of the retaining system of the present invention is to be interpreted in accordance with above definition. It is naturally possible to provide additional retaining parts for the pelvic region of the passenger in addition to the essentially U-like retaining part, if for example further parts of the body are to be secured in a certain position, for example the upper body with shoulder bails etc. Moreover it is also to be noted that the shape of the retaining part in the pelvic region only has to substantially surround the body of the passenger to be secured and for this purpose must all assume suitable shapes, which however are substantially the same as a U-like shape.

In order to hold the retaining device in the retaining position there is preferably a latching system, which more particularly renders possible a plurality of latching positions so that dependent on the type of passenger to be secured a plurality of latching positions and accordingly retaining positions are possible. Preferably the latching system can only be released by the attendant personnel, more particularly by remote control whereas the various different latching positions may be set by the passenger himself as well as by the personnel.

In accordance with a second aspect the invention is characterized in that the retaining device, which is provided at the connection between the seat and the back rest, that is to say in the pelvic region, has a substantially U-like bail which is so rotatable and shiftable or arranged to move in a slide that different latching positions are possible, such different latching positions involving changes in the distance apart of the bail and the chair member and, respectively, in the possible width of the chair member. If the bail is therefore moved further and further toward the chair member on locking the retaining device, there will be not only a reduction in the distance from the chair member but also in the chair member's width. This will mean that, irrespectively of the form of the passenger an optimum securing action is at all times ensured without the passenger being able to slip through the securing means or being excessively squeezed by it.

In order however to arrive at a suitable latching position for the U-like retaining part in accordance with the invention in the anthropometric retaining plane, in accordance with a further aspect of the invention, for which protection is claimed independently a measuring system is provided, which serves to ascertain the necessary locking position. The measuring system comprises, in accordance with the invention, a band-like or cable-like element arranged between the ends of the U-like retaining part, which on locking of the retaining device abuts the passenger to be secured and owing to the bulging outward of the band- or cable-like element means that the required locking position may be ascertained. Preferably this is ascertained because owing to the length drawn out of a self-retracting or self coiling up strap, or the stretch or the tension of an elastic or otherwise moving band, cable or the like same may be employed for the ascertainment of the locking position. In fact the longer the distance which a self-retracting strap is pulled out or the farther an elastic element is stretched, the more corpulent the passenger to be secured must be and the smaller the distance which the U-like retaining part must snap into the latching means in order to achieve an optimum retaining position. As a corollary, in the case of a small degree of bulge of the self-retracting strap or corresponding elastic element the optimum latching position will only be reached, when the U-like retaining part has snapped a considerable distance into the latching means and accordingly the distance between the retaining part and the chair member is correspondingly reduced.

The retaining part or, respectively, locking part can be designed in various different shapes and combinations of rigid or, respectively, flexible elements such as bands, straps and the like if a substantially U-like retaining part, in accordance with the above definition is placed about the pelvic region in the optimum anthropometric plane.

For instance, the locking part may be in the form of a swinging, U-like, rigid bail, which together with the latching means constitutes the U-like retaining part. In contradistinction to this the locking part may also be constituted by a ring, which is put on the passenger to be secured at his waist and which then also with a latching means and the front part of the ring constitutes the U-like part in the anthropometric plane. Furthermore retaining devices are contemplated, in the case of which the locking part is constituted by one or more frames, on which for example suitable strap material is arranged so that on locking the straps engage the passenger to be secured and at least a part of the strap material again constitutes the U-like retaining part in the anthropometric plane.

In accordance with the embodiments described the different retaining devices may be designed with different rotary joints, pivotal arms, slides and latching systems and the like. In this respect it is to be remarked that it has proved to be particularly suitable for the chair member to form a single unit with the retaining device so that the chair member may be arranged together with the retaining device independently of adjacent components like tha understructure of the body and such like and an independent restraining system results. In this connection it has also turned out to be an advantage for the taking up of force when the retaining device is acted upon, that is to say in an emergency, to be directly by way of the chair member and more especially in the case of the provision of, for instance, two latching units symmetrically occurs at the two ends of the U-like retaining part.

Furthermore it as been found to be an advantage for the different latching positions or, respectively, the distance of the U-like retaining part from the chair member to be selected to match the length of the seat and/or of the back rest, since it is then possible to avoid a passenger to be secured slipping underneath the retaining device or, respectively, the retaining part. In this connection it has also proved convenient to adapt the seat and/or the back rest to the shape of the passenger's body or at least to draw up the edges of the seat and/or the back rest, something which in fact means an extension of the seat or, respectively, of the back rest.

Further features, advantages and particulars of the present invention will be seen from the following detailed description of preferred working embodiments with reference to the accompanying diagrammatic drawings.

BRIEF DESCRIPTION OF THE DRAWINGS

FIG. 12a is a perspective view of a tenth embodiment including a view of part in greater detail in FIG. 12b.

FIG. 12b is a more detailed showing of parts of the structure illustrated in FIG. 12a.

DETAILED DESCRIPTION OF THE PREFERRED EMBODIMENTS

Figure 1:
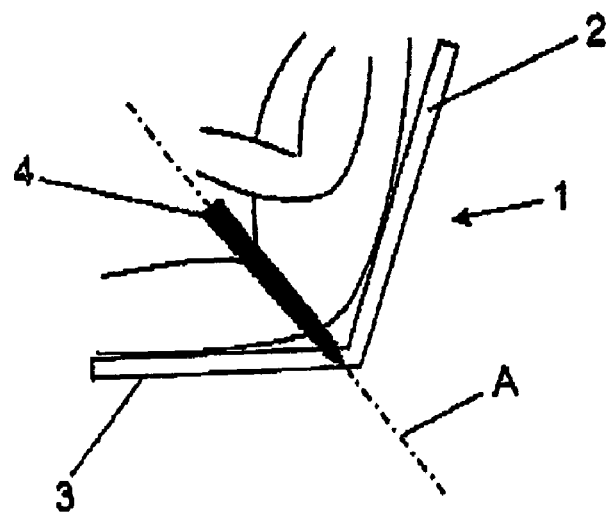
FIG. 1 is a lateral view of a restraining system in accordance with the invention.

FIG. 1 shows a lateral view of the principal structure of the retaining system in accordance with the invention. Such structure comprises a chair member 1 with a back rest 2 and a seat 3, a retaining device or a retaining part 4 being provided in the pelvic region of a person or passenger on the chair member whose seat is inclined at an angle of approximately 25° to the horizontal, such retaining part surrounding the passenger or, respectively, his pelvic region like a letter U and being arranged in a plane A making an angle α with the horizontal of preferably approximately 45° and more especially 44.6°. Owing to the arrangement in accordance with the invention in the pelvic region of the passenger to be secured it is possible to ensure that any passenger whether corpulent or slim, tall or short is securely held on the chair member 1 with an optimum freedom of movement and without any danger of falling off in the case of an amusement ride involving somersaulting, steep curves and the like.

The retaining device or, respectively, the retaining part may be designed in accordance with the following working embodiments and more particularly in a multi-part or integral manner.

Figure 2:
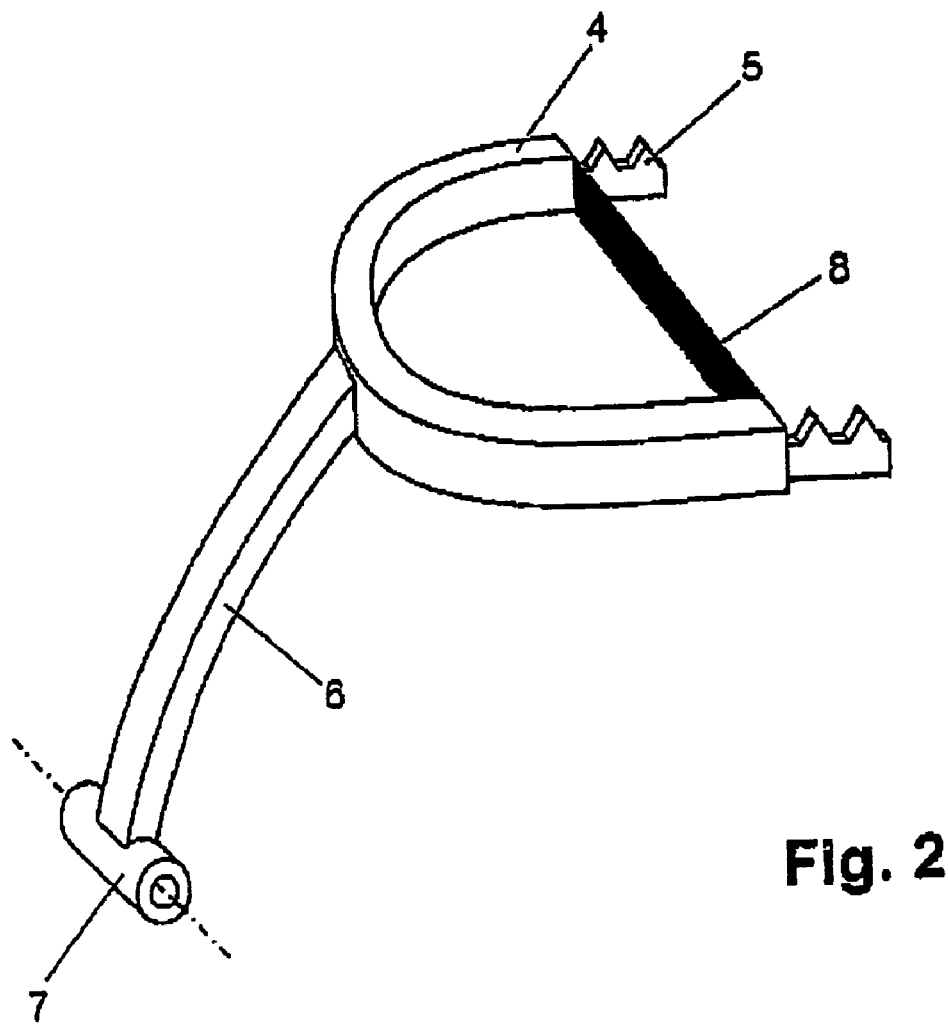
FIG. 2 is a perspective representation of the locking part of a first embodiment of the restraining system in accordance with the invention.

In accordance with the design of FIG. 2 the retaining part 4 is in the form of a U-like bail, which together with the lever arm 6 fixed on the bail 4 at the same time constitutes the locking part of the retaining system of the invention. The bail 4 with the lever arm 6 is rotatably mounted using a rotary joint 7, here in the form of a bearing bushing, in which a bearing pin may be inserted so that the bail 4 may be pivoted away from and toward the chair member. At the ends of the bail detent elements 5, here in the form of a rack, are provided, which may slip into a mating part, not illustrated, and so cause latching of the bail 4, for example on the chair member. This is for example represented in different embodiments in FIGS. 3 and 4. Naturally other latching systems are possible as well, as for example a flat steel band provided with holes, which cooperates with a moving pin, or a hydraulic locking system.

In addition a self-retracting strap 8 is provided in accordance with FIG. 2, which is a part of a measuring system for determining the most favorable latching position for the bail 4. The self-retracting strap 8 is namely drawn out on pivoting the bail 4 toward the passenger to be secured in a manner dependent on the outline of the passenger and measuring of the length of the unwound strap may be employed to determine the most favorable latching position. For this purpose it is merely necessary to provide suitably adapted devices for the measurement of the unwound or paid off length of strap and for determining the accordingly most suitable latching position, for example a suitable register or memory for lengths and corresponding latching positions. Using this measuring system it is then possible for warnings to be issued to the attendant personnel if for certain chair members there has been no optimum latching.

Figure 3:
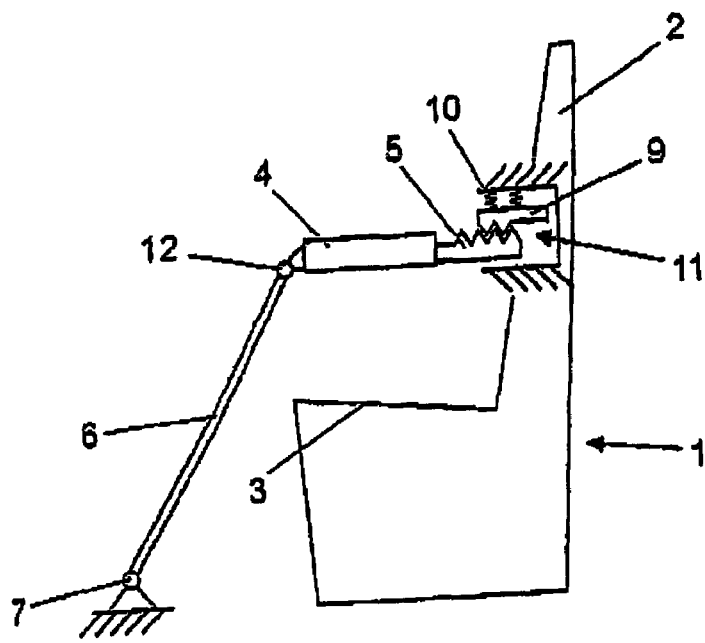
FIG. 3 is a side view of a second working embodiment.

FIG. 3 is a lateral view of the bail 4 with the pivot lever 6 as in FIG. 2 in conjunction with a chair member 1. However, it is in this case to be taken into account that FIG. 3, owing to its diagrammatic nature, does not show the angular arrangement in accordance with the invention of the retaining part 4 in relation to the horizontal or the seat 3. FIG. 3 does however serve to indicate that the U-like bail 4 may be not only fixedly arranged on the pivot arm 6 as in FIGS. 2 and 4, but also by way of a joint 12. In this case the locking means 11 is rigidly integrated in the chair member 1. In the other working embodiment of FIGS. 2 and 4 on the contrary the latching means is pivotally mounted on the chair member or an adjoining component.

The latching means 11 itself is constituted by a recess, in which a detent element 9 is arranged, which is designed in a complementary manner to the rack 5 on the bail 4 so that the teeth of the rack 5 may fit into the recesses of the detent element 9. The detent element 9 is for example held by way of a spring element 10 in a biased position in which the detent element 9 and the rack 5 are in mutual engagement. On engagement of the bail 4 with the rack 5 in the latching means 11 the detent element 9 is thrust back against the spring force of the springs 10. In this case both the teeth of the rack 5 and also the detent tooth of the detent element 9 are so designed that further insertion of the bail 4 with the rack 5 is possible without any substantial effort, whereas retraction of the rack 5 out of the latching means 11 is solely possible if an attendant releases the bias of the detent element 9, for example by remote control.

Figure 4:
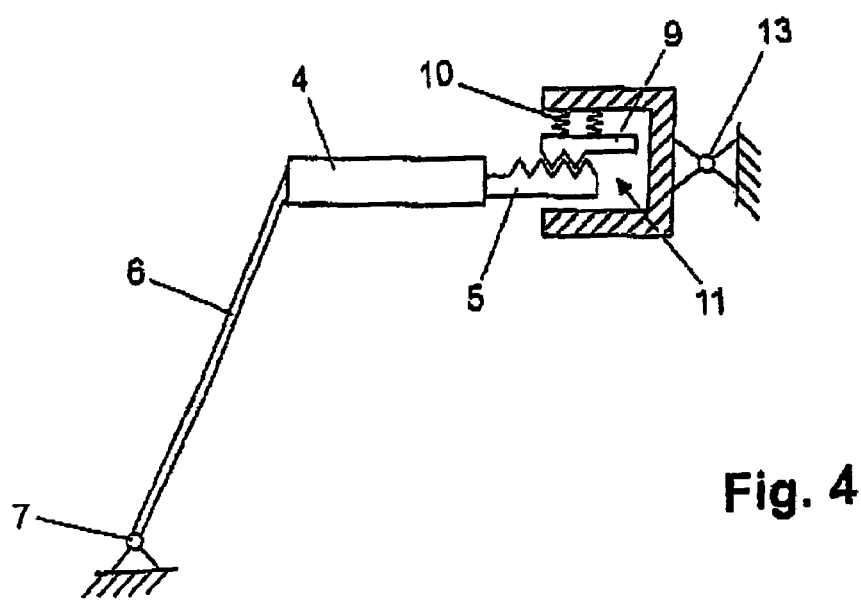
FIG. 4 is a side elevation of the embodiment in accordance with FIG. 2.
Figure 5:
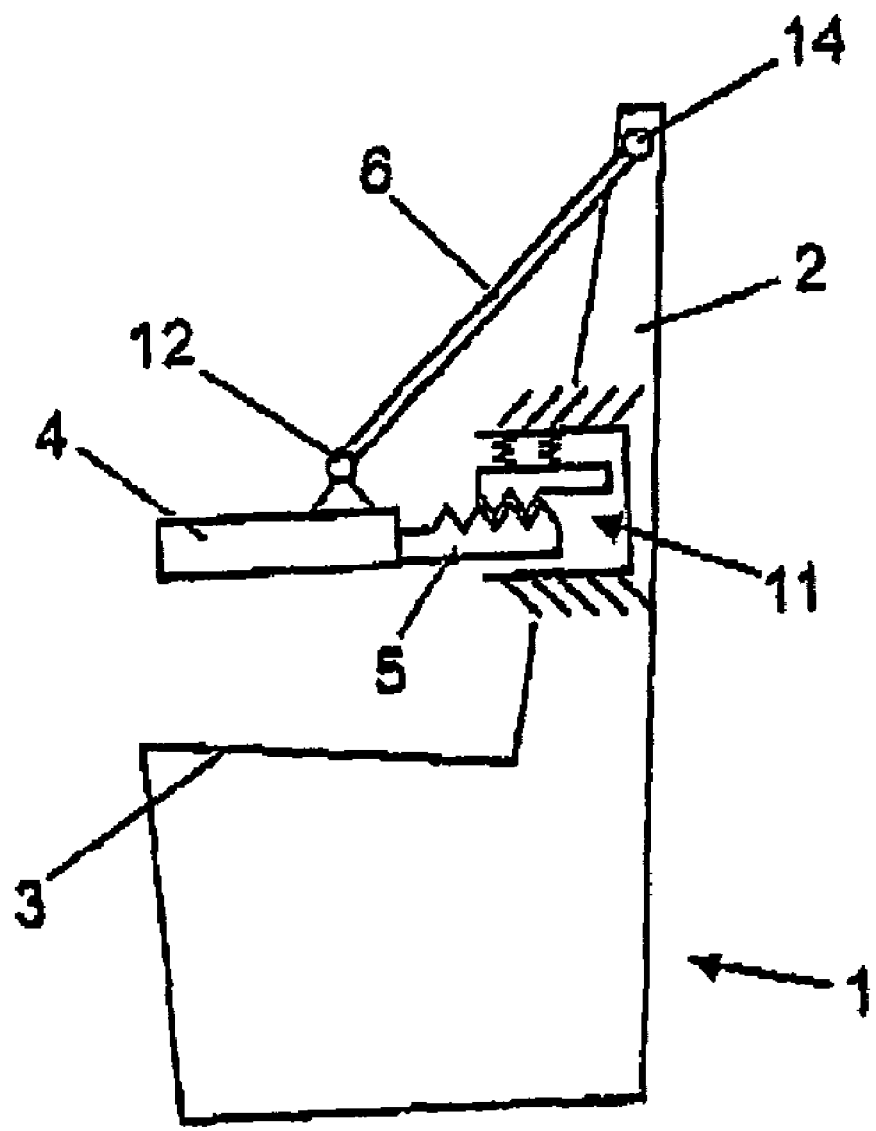
FIG. 5 is a side view of a third embodiment.

FIG. 5 shows a side view of a further embodiment substantially resembling the embodiments of FIGS. 2 through 4 while however differing as regards the pivoting or mounting of the U-like bail 4. In the working embodiment illustrated in FIG. 5 the U-like bail is pivotally connected directly to the chair member 1 using one or two pivoting arms or, respectively, spars 6, there being intermediate rotary joints 12 and 14 which are arranged between the bail 4 and the pivot arm 6 or, respectively, between the pivot arm 6 and the back rest 2. In a fashion similar to the embodiment of FIG. 2 on the ends of the U-like bail 4 corresponding detent elements 5 and, respectively, racks are provided for engagement with the latching means 11. The arrangement of two racks 5 at each end of the U-like bail offers the advantage that a symmetrical latching or snapping in of the retaining means is provided for. Since in the case of example of FIG. 5 the retaining bail 4 is arranged directly on the chair member 1 by way of the pivotal arms 6, there is a compact and independent design of the retaining system, which may be arranged independently of the surrounding components, as for example understructures of the body, and the like on a amusement ride.

Figure 6:
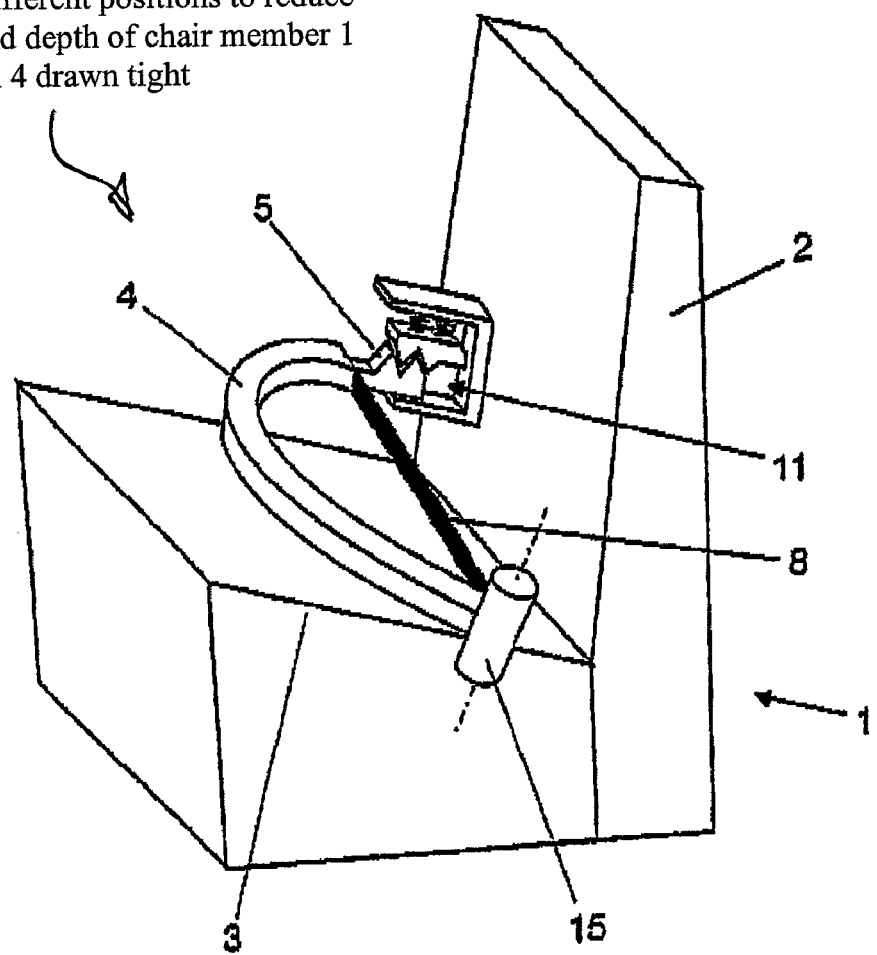
FIG. 6 is a perspective view of a fourth working embodiment.

A further embodiment is illustrated in FIG. 6 in perspective. The retaining system depicted in FIG. 6 is characterized in that the bail 4 is directly pivoted by way of a rotary joint 15 on the chair member 1 without the interposition of a lever arm or pivoting arm. As was the case with the previous embodiments here again a significant feature of the invention is that the bail is arranged in the anthropometrically optimum plane, namely at an angle of approximately 45° to 50° to the horizontal, the seat 3 being inclined at 25° to the horizontal. In the case of the embodiment illustrated in FIG. 6 this may be achieved in a simple manner if the axis of rotation of the rotary joint 15 is so arranged that it is perpendicular to the anthropometrically optimized plane of the retaining bail 4.

At the free end of the retaining bail 4 opposite to the end, which is on the rotary joint 15, there is again a detent element 5 for latching the bail 4 in the chair member 1. This embodiment as well means that the retaining means is united with the chair member 1 and accordingly there is a compact and independent unit as the retaining system unit. In the case of the embodiment of FIG. 6 illustrated the measuring system is again realized with the self-retracting strap 8. This measuring system may be employed generally and independently of the previously described embodiments.

Figure 7:
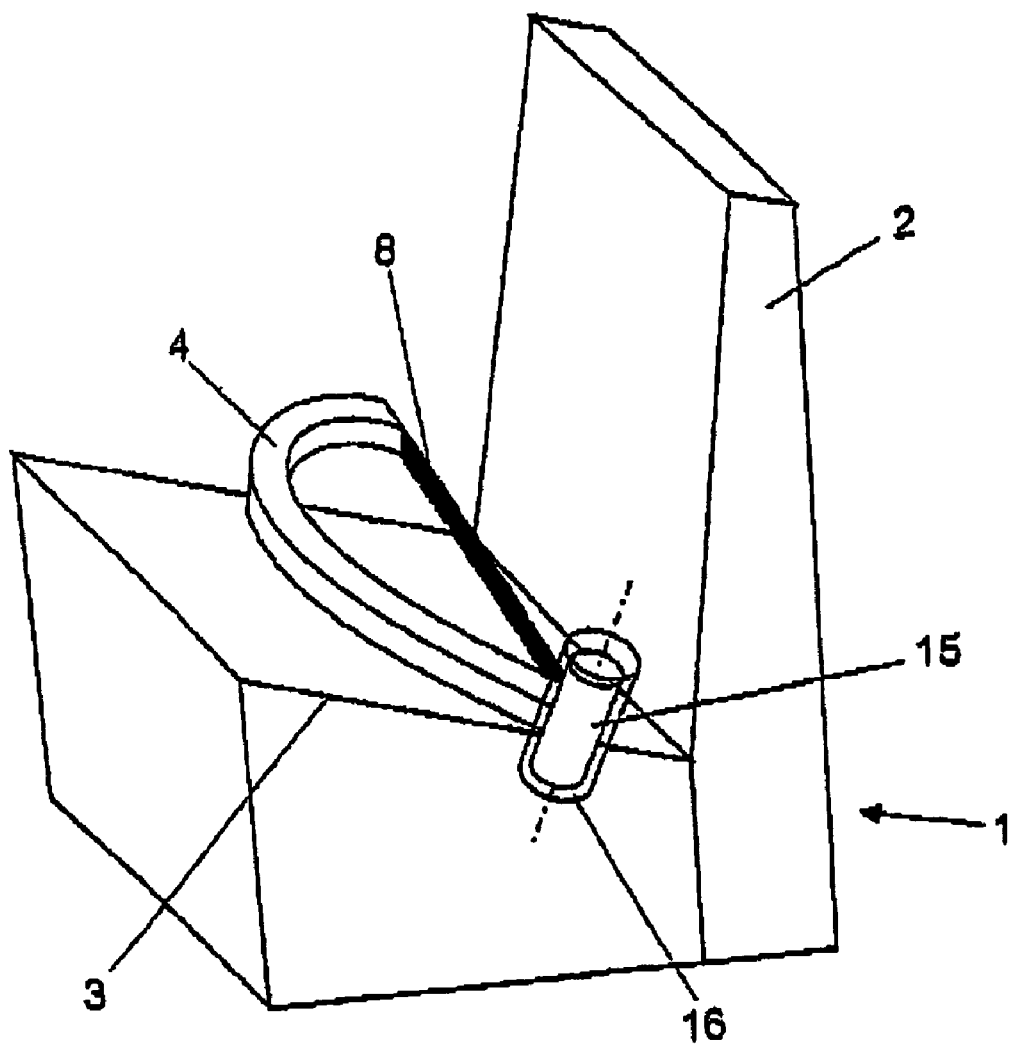
FIG. 7 is a perspective view of a fifth working embodiment.

The embodiment of FIG. 7 differs from the embodiment of FIG. 6 only in that the rotary joint 15 for the pivotal arranged of the bail 4 on the chair member 1 is additionally combined with a latching unit 16 so that there is the advantage that only one housing must be provided. A corresponding latching means may for example be provided by having a gear wheel on the rotary joint 15 and a corresponding detent element similar to the previously described latching systems. The combination of the rotary joint 15 and the latching unit 16 offers the advantage that the latching action takes place in a closed housing so that injury or damage is prevented when the latching means is operated.

Figure 8:
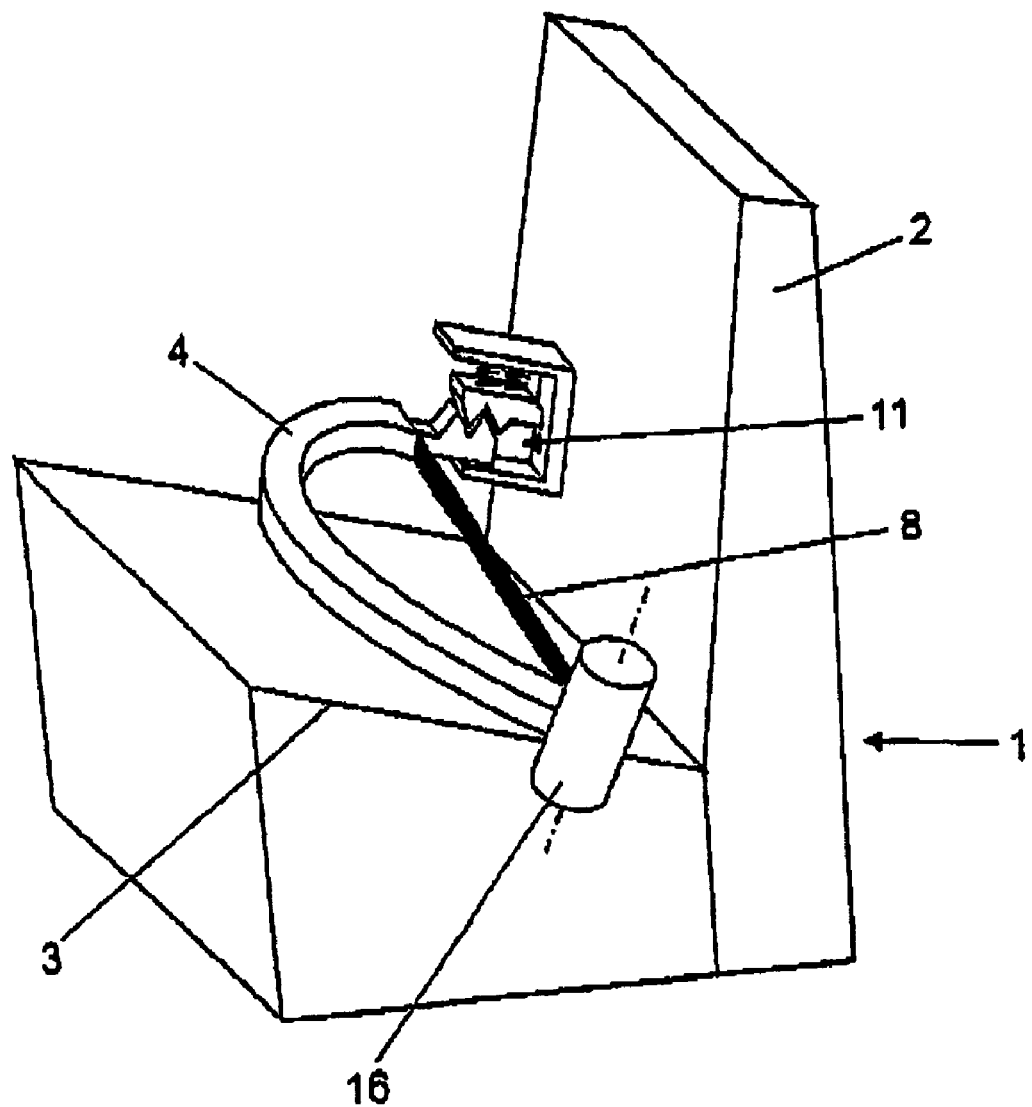
FIG. 8 is a perspective view of a sixth embodiment.

In the working embodiment illustrated in FIG. 7 owing to the latching action at the rotary joint 15 it is possible to do without a further latching action at the other end of the bail 4, whereas in the case of the embodiment of FIG. 8 two latching actions are provided for, namely on the one hand the joint latching means 16 on the rotary joint 15 and on the other hand the latching at the opposite end of the retaining bail 4.

Figure 9:
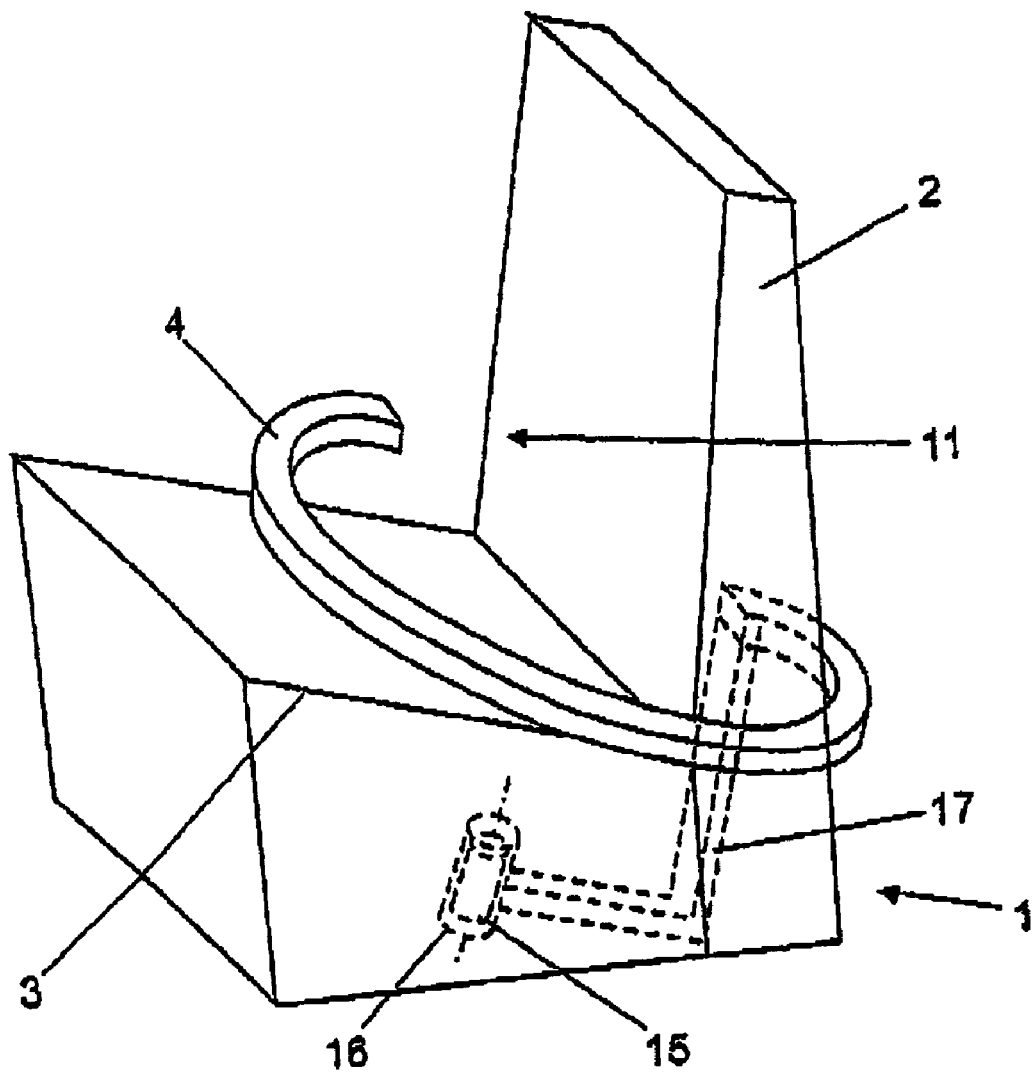
FIG. 9 is a perspective view of a seventh embodiment.

An embodiment, which is a modification of the previous embodiments is represented in the perspective elevation of FIG. 9. In this working embodiment the rotary joint 15 is preferably provided with an integrated multi-stage latching means 16 underneath the chair member 1 or in the lower region of the chair member 1 and the retaining bail 4 is connected by way of a linkage 17 with the rotary joint 15. In this case it is to be noted that the axis of rotation is to be eccentric in relation to the middle of the chair member or, respectively, to the imaginary central point of the bail circle so that a pivoting of the bail 4 by means of the linkage 15 will be accompanied by a change in the distance of the bail 4 from the chair member 1 and accordingly it is possible to have a latching position of the bail 4 adapted to the height of the passenger to be secured. The linkage 17 does however not necessarily have to be moved in rotation. The retaining bail 4 may be moved also by any desired movement, as for example along a three-dimensionally curved guide bead in space, or along a slide or the like.

Figure 10:
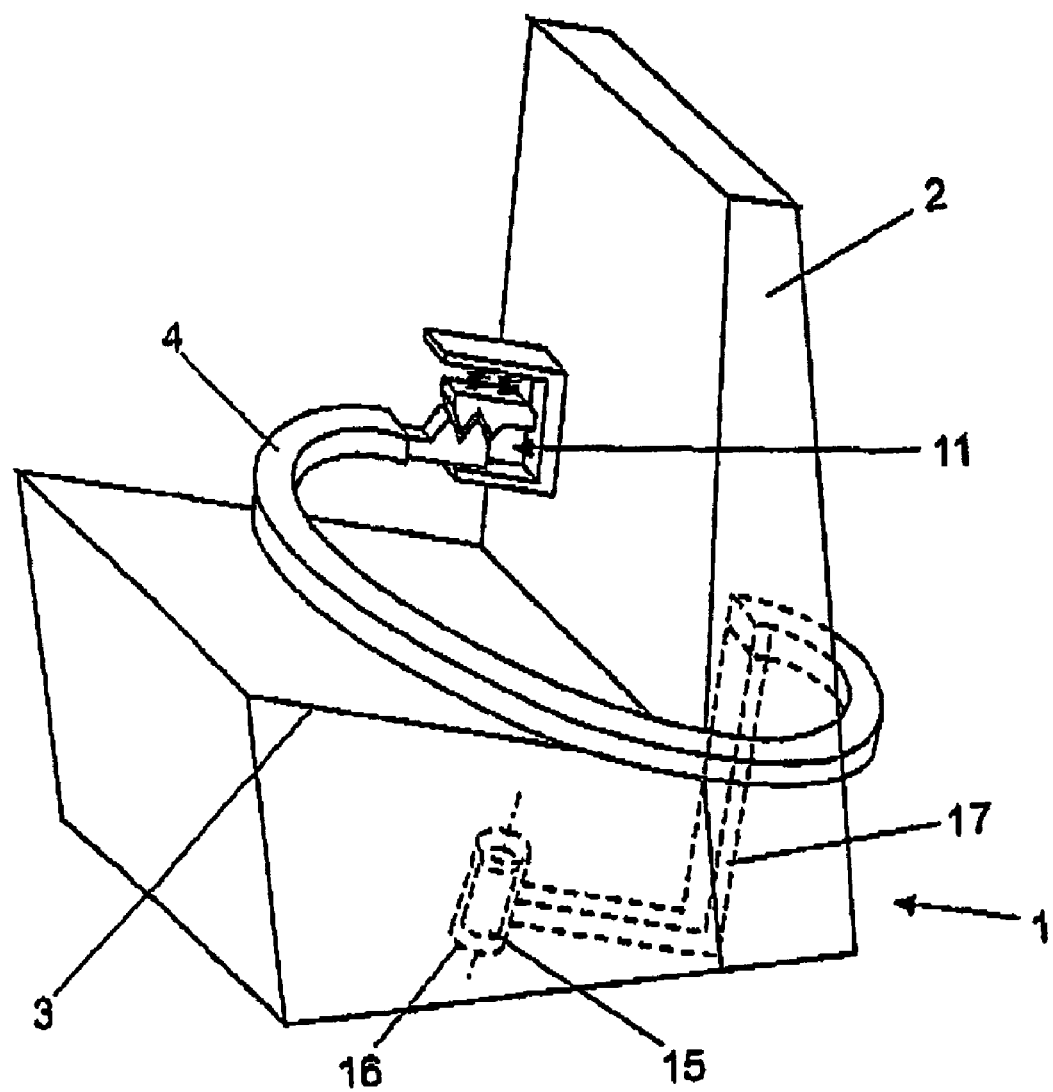
FIG. 10 is a perspective view of an eighth embodiment.

In a manner similar to the working example of FIG. 6 in the case of such an embodiment as in FIG. 9 it is possible to provide for additional latching at the other end of the bail 4 or, respectively, chair member 1, as is depicted in FIG. 10.

Figure 11:
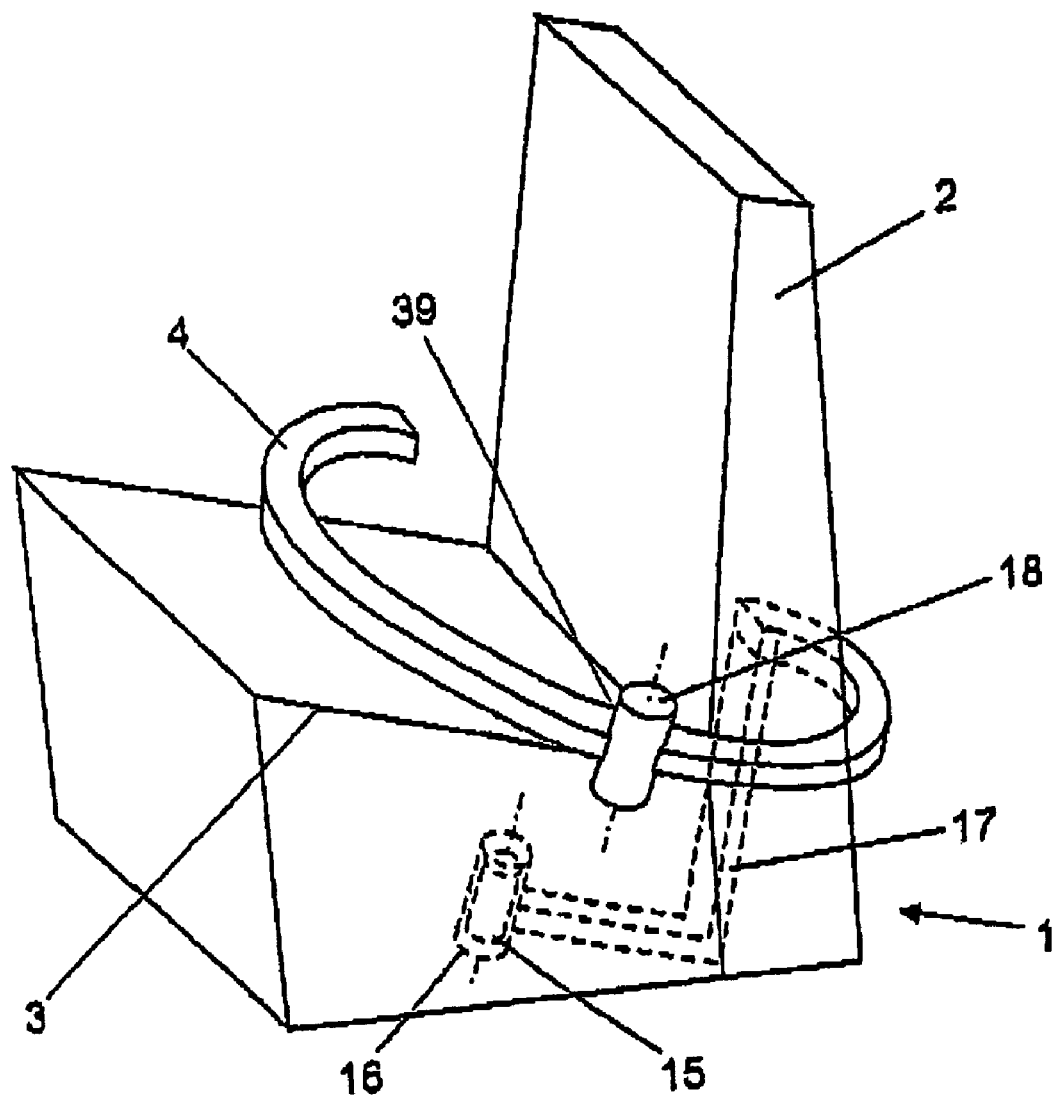
FIG. 11 is a perspective view of a ninth embodiment.

Moreover it is in accordance with the embodiment of FIG. 11 possible for the retaining part 4 or, respectively, the bail 4 to be further divided up, that is to say using a further rotary joint 18. It is in this manner that it is possible for a coarse and fine latching or, respectively, positioning of the bail 4 to be achieved, more especially when the rotary joint 18 also has integrated latching function, which renders possible a plurality of latching positions, as is the case with the preceding embodiments. In this case then the bail 4 may be firstly coarsely set by way of the rotary joint 15 and the latching means 16 integrated in it, while by pivoting the bail 4 about the rotary joint 18 with the integrated latching means 39 fine setting of the position is possible. In the case of this embodiment the pivot point 15 can be arranged centrally in contradistinction to the preceding embodiments.

Figure 12:
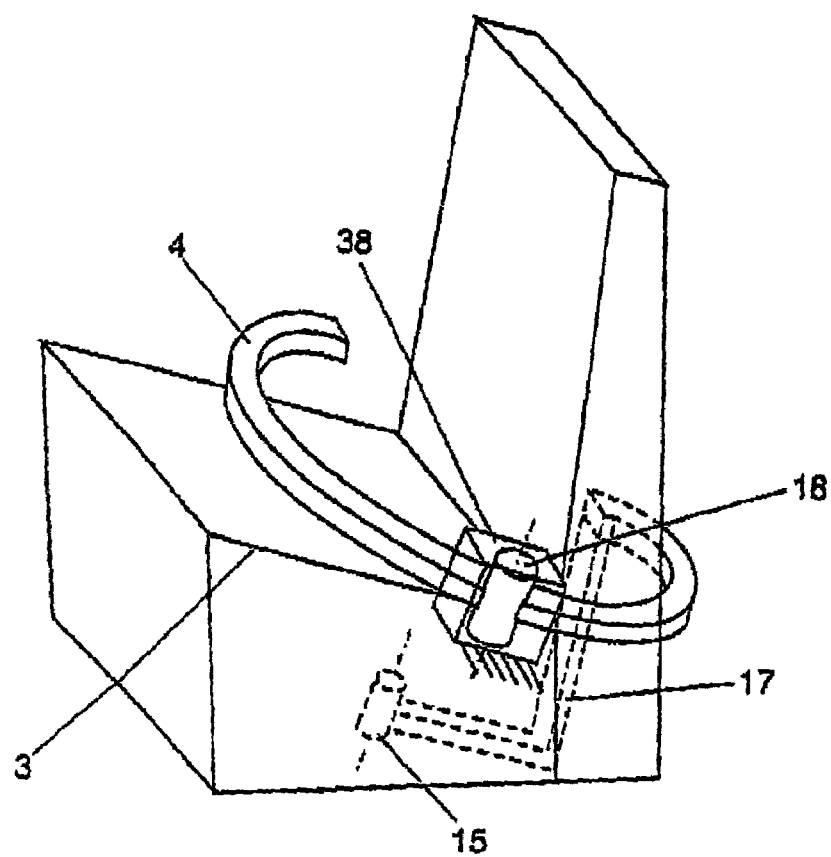
Figure 12:
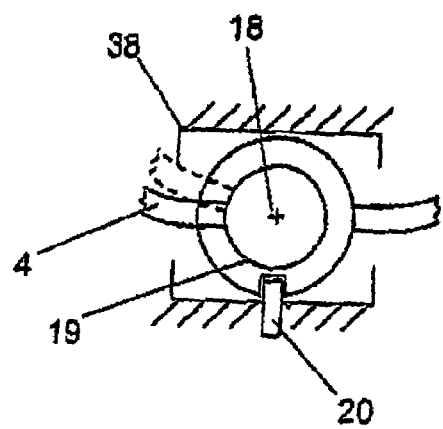

A still further embodiment of the retaining system is illustrated in FIGS. 12a and 12b. In the perspective view of FIG. 12a it will be seen that the retaining device is also divided up into a linkage 17 and a retaining bail 4, the linkage 17 being arranged for rotary movement about the rotary joint 15, whereas the retaining bail 4 is again attached to the linkage 17 by way of rotary joint 18. The linkage 17 is able to be freely turned about the rotary joint 15 and is after a first feed movement of the linkage 17 fixed or locked in relation to the axis 17 of rotation by a latching mechanism 38, which is diagrammatically indicated in FIG. 12a. The latching takes place for example by using an arresting pin 20, which is illustrated in plan view in FIG. 12b. The retaining bail 4 can then be moved about the rotary joint 18 further toward the position to be secured, a fine latching means 19, which is integrated in the rotary joint 18, providing for latching and securing functions as regards the retaining bail 4.

Figure 13:
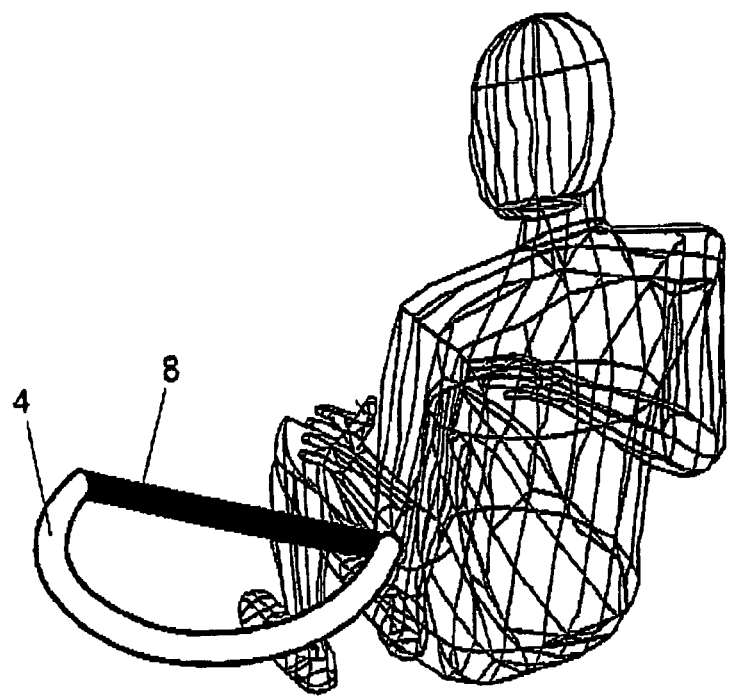
FIGS. 13a and 13b are perspective views of the measuring system in accordance with the invention.
Figure 13:
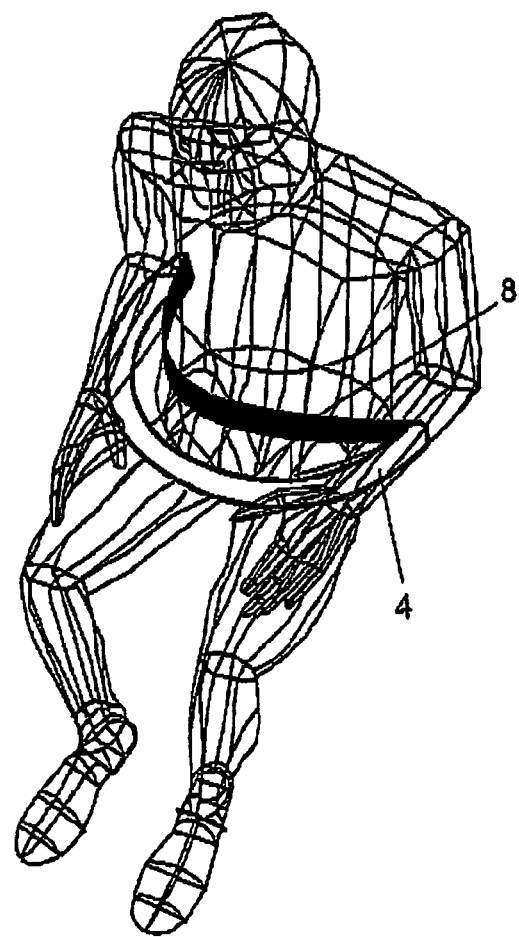

FIGS. 13a and 13b serve to make clear the workings of the measuring system with the self-retracting strap 8. In the released state of the retaining device in accordance with FIG. 13a the strap is held taut between the ends of the bail 4. On closing the bail 4 as illustrated in FIG. 13b the strap 8 snugly engages the body of the passenger to be secured, something which leads to an extension of the strap 8. This extension of the strap 8 may then be measured or detected with a length measuring system. A comparison between length changes as stored in a memory with the respective latching positions will then indicate the optimum latching position to be employed. If this is not achieved a suitable warning system will warn the attendant personnel or by way of an automatic emergency switch the amusement ride may even be halted.

Although in accordance with the present invention a sufficient securing effect for a passenger on a chair member 1 is provided by the retaining device in the pelvic region of the passenger to be secured, in certain circumstances it can be necessary for further parts of the body of the passenger, as for instance the upper body or the legs to be secured in certain positions in order to prevent a collision with the passenger to be secured with objects or the like moving past at a close distance. For this purpose in accordance with the embodiment of FIG. 14 further retaining devices or retaining parts, as for instance a shoulder bail 25, a suspender strap 26 and the like may be provided.

Figure 14:
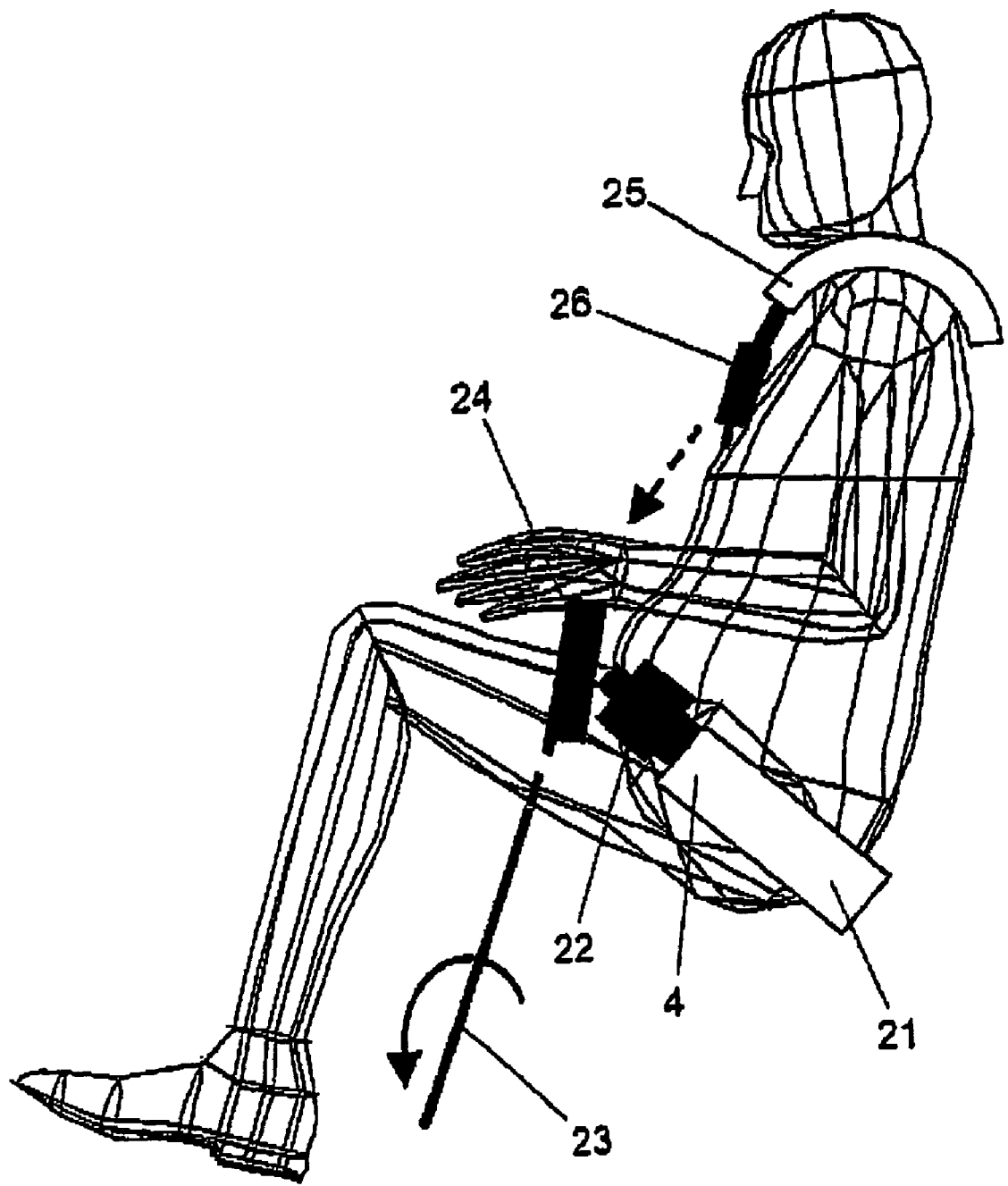
FIG. 14 is a lateral view of an eleventh embodiment.

In the case of the working embodiment of FIG. 14 for this purpose the U-like retaining part 4 is designed in two portions, that is to say a fixed, rigid shank 21 and a flexible strap 22, which may be made fast using a buckle on the shank 21.

Owing to there being a suitable design of the shank 21 in this embodiment as well the arrangement in accordance with the invention of the U-like retaining part in the anthropometrically optimized retaining plane is obtained.

In order to fix the suspender straps 26 a strap buckle may be additionally provided between the passenger's legs on which for example the strap 22 of the U-like retaining part 4 may be attached. In order to move the strap buckle into the correct position a pivoting lever 23 is provided.

Figure 15:
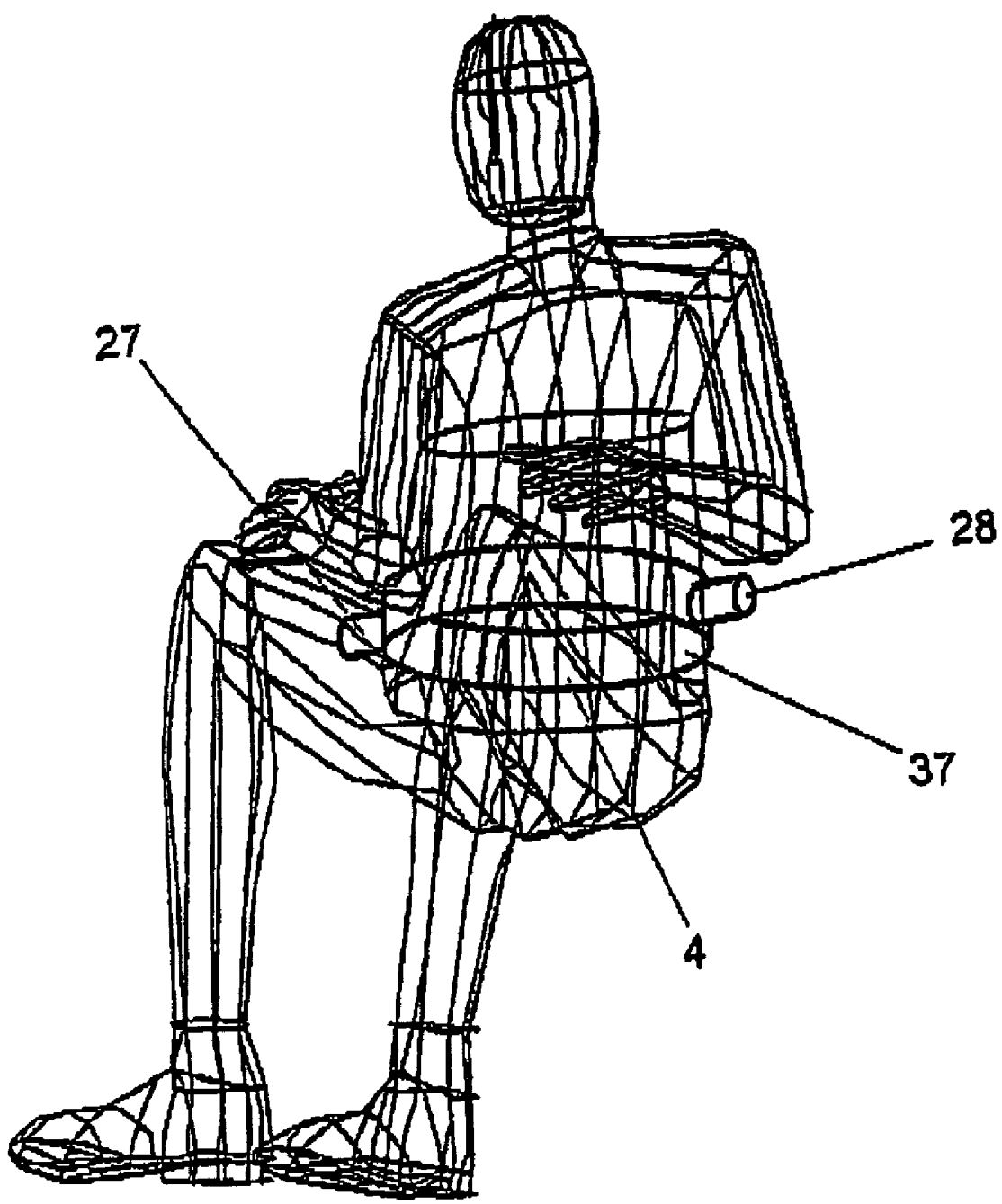
FIG. 15 is a perspective elevation of a twelfth embodiment.

In the working embodiment illustrated in FIG. 15 as a part of the retaining device a ring 37 is provided, which almost like a belt is placed around the passenger to be secured. Owing to the latching elements 28 and 27 provided on the ring 37 the ring 37 snaps into suitable catch or latching elements (not illustrated) on the chair member. It is in this manner that the front part of the ring 37 and the latching means, not illustrated, into which the latching elements 27 and 28 fit, constitute the U-like retaining part in the anthropometrically optimized retaining plane. The advantage of this embodiment is that the passenger to be secured may apply or put on the securing ring 37 even prior to getting on the amusement ride so that the act of being actually secured to the amusement ride only requires a short time and accordingly the number of passengers able to use the ride per hour is high. Furthermore, using the securing ring means that the anthropometrically optimized retaining plane may be selected in a wide angular range. It would be feasible as well for the ring to have an adapted form, as for example a triangular one in a side view so that the retaining functions of integrated carrying elements may be assumed, which extend along one limb of the triangle in the anthropometrically optimum plane.

Figure 16:
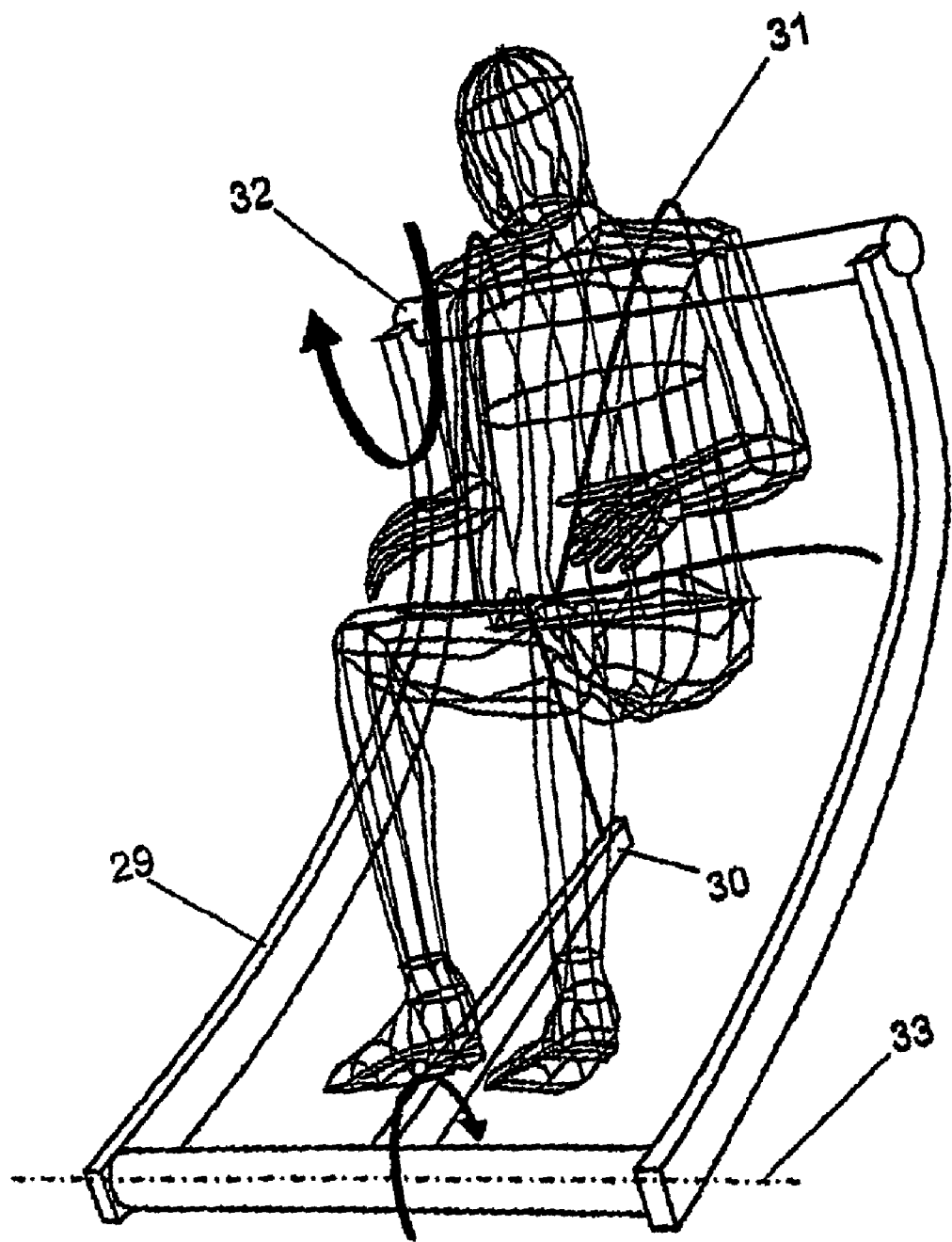
FIG. 16 is a perspective view of a thirteenth embodiment of the invention.
Figure 17:
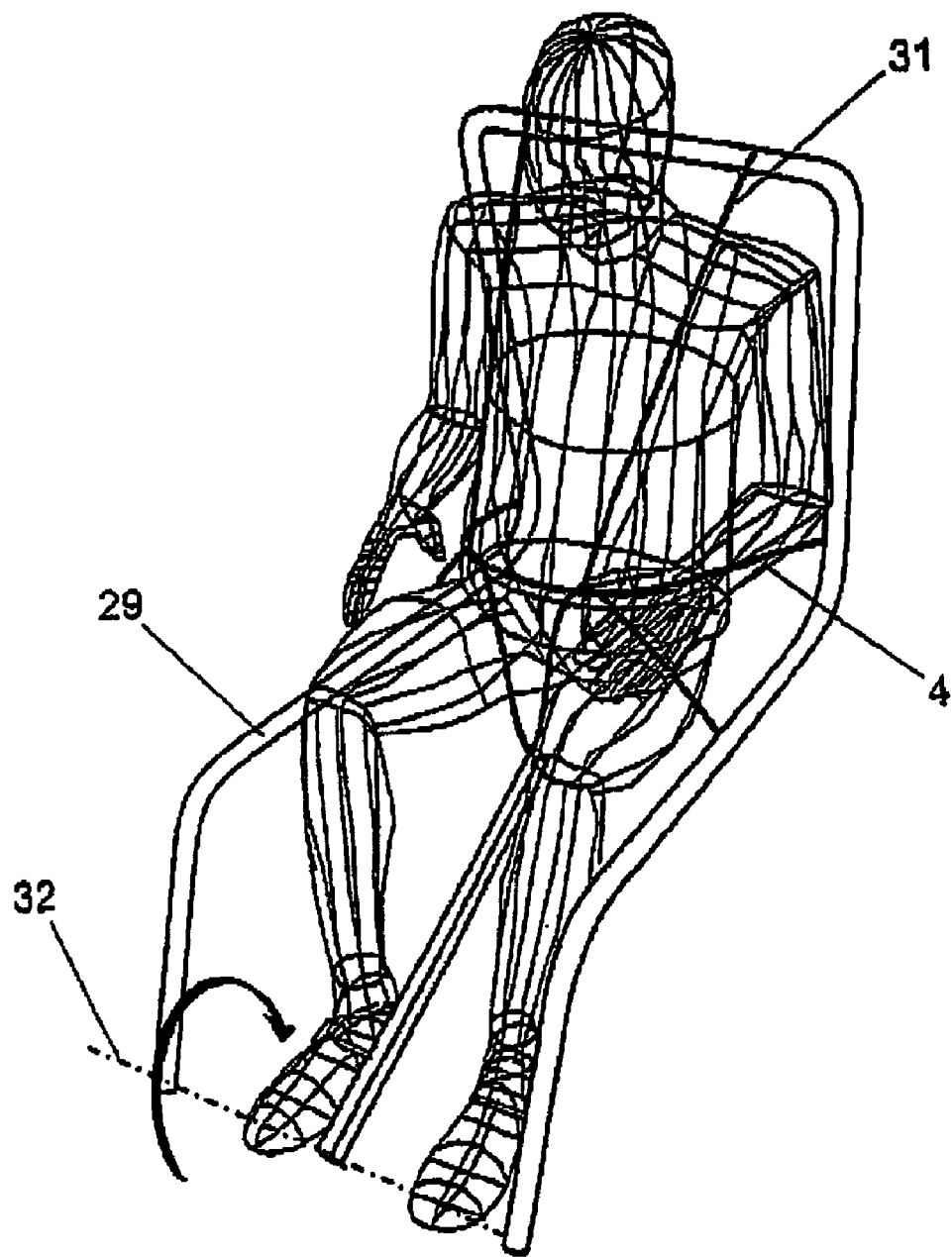
FIG. 17 is a perspective view of a fourteenth embodiment.
Figure 18:
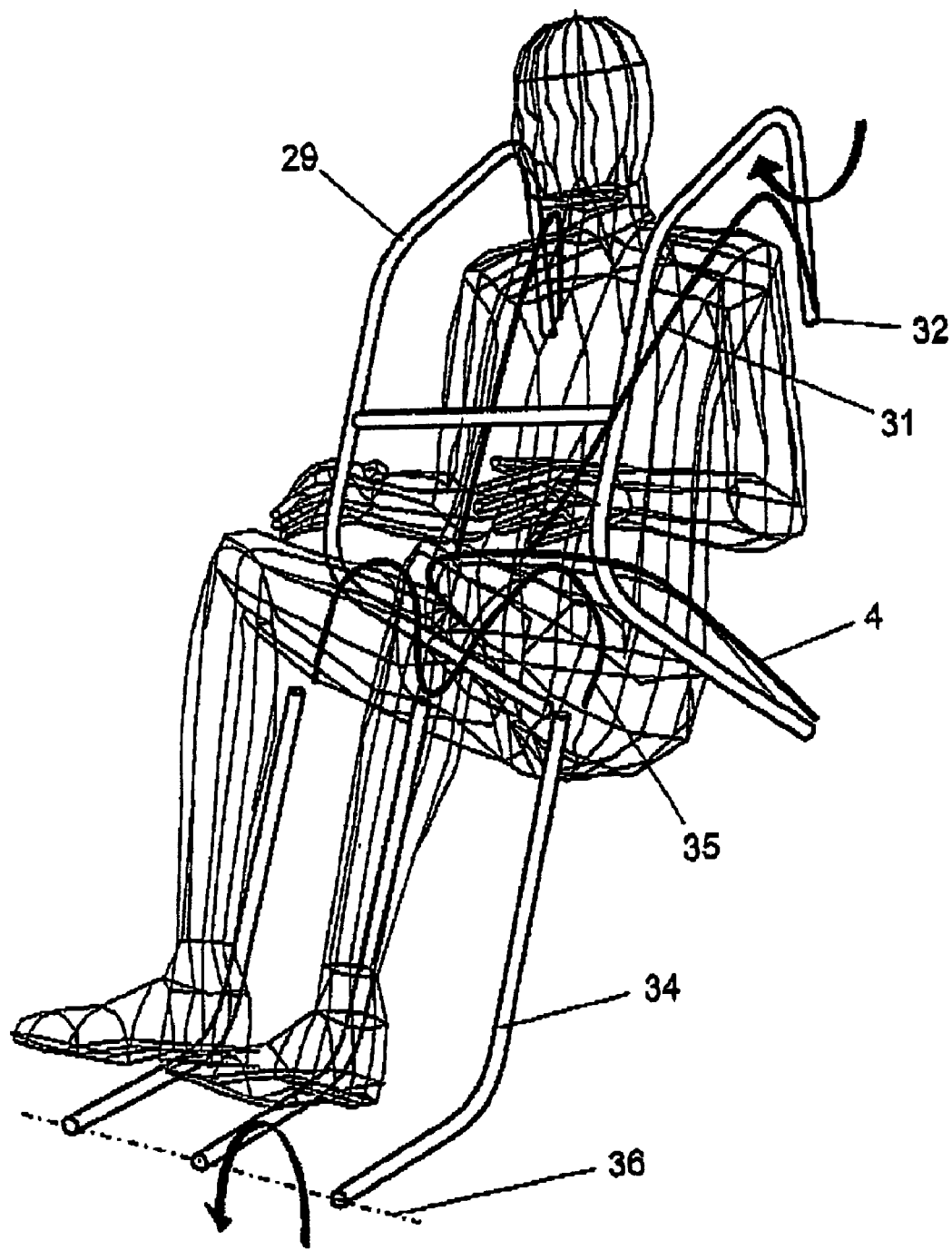
FIG. 18 is a perspective elevation of a fifteenth embodiment.

A further type of retaining device is illustrated in FIGS. 16 through 18. In the case of this retaining system in accordance with the invention the retaining device is constituted by a frame 29 and, respectively, a plurality of frames 29 and 34 (FIG. 18), straps 31 or retaining bands or the like being provided, which during tilting of the frames 29 and 34 engage the passenger to be secured.

Thus for instance on the frame 29, which is illustrated in the embodiment of FIG. 16, a strap 31 is attached, which on tilting of the frame 29 about an axis 32 comes into engagement with the passenger to be secured as a suspender strap and pelvic strap. The U-like retaining part 4 is in this embodiment in the form of the pelvic strap. In addition a pivoting bail 30 is provided on the frame 29, which is able to be pivoted about the axis 33 of rotation at one end of the frame 29 and positions a further securing strap between the legs of the passenger. The entire frame 29 is pivoted about the axis 32 of rotation from behind over the passenger to be secured.

As shown in FIG. 17 it is possible for the axis 32 of rotation also to be arranged in front of the passenger to be secured and the form of the frame 29 can be selected in accordance with the straps 31 provided in many different possible designs. In the working embodiment illustrated the longitudinal beams of the frame 29 practically have an S-shape.

As shown in FIG. 18 the retaining device may also be constituted by a plurality of frames 29 and 34, which have their own corresponding straps 31, 4 and 35. In the working example of FIG. 18 the frame 29 is swung from above over the axis 32 of rotation and from behind onto the passenger to be secured so that the straps 31 come into engagement on the one hand as suspender straps and on the other hand as a pelvic strap 4. Moreover, a further frame 34 is pivoted over the axis 36 of rotation forward onto the legs of the passenger to be secured so that the thigh straps 35 secure the passenger's legs.

The invention claimed is:

1. An amusement ride retaining system, comprising:
an amusement ride chair member for passengers of different types, sizes and forms to sit on, wherein said chair member is not vertically attached to and supported by a seat located beneath said chair member; and
a passenger retaining device provided for the chair member of the amusement ride vehicle for securely holding passengers on the amusement ride chair member against being dashed about by dynamic movements and rotary movements of the amusement ride chair member and against falling off the amusement ride, said retaining device having an essentially U-shaped rigid bail and a latching device, said bail being movable between at least one getting on position and at least one retaining position,
wherein the bail is provided at least adjacent to a connection region of the seat with the back rest so that in the retaining position the bail surrounds, at least to a major extent, the pelvic region of the passenger using the chair member and wherein the bail is arranged in an anthropometrically optimized plane, which is inclined at an angle of 40° to 50° with the horizontal, and when the amusement device is in the position ready for the passenger to get on and off, the seat is at an angle inclined to the horizontal in a range of 0° to 30°, and the back rest is inclined to the seat at an angle of 70° to 95°, the bail being structured to support the entire weight of the passenger to be restrained and to contact the pelvic region of the passenger to prevent the passenger from being ejected from the vehicle when subjected to the dynamic and rotary movements of the amusement ride chair member.

2. The retaining system as set forth in claim 1, wherein the retaining device includes a flexible strap.

3. The retaining system as set forth in claim 1, said latching device including a detent mechanism, the passenger using the chair member only being able to set the different latching positions in a sequence with a decreasing distance and release of the latching device takes place by attendant personnel, the latching device comprising a rack or a perforated plate, for engagement by a detent element in different positions or a hydraulic latching device.

4. The retaining system as set forth in claim 1, wherein the retaining device is arranged directly on the chair member the latching device being integrated in the chair member.

5. The retaining system as set forth in claim 1, wherein the retaining device comprises a measuring system for determining the necessary latching position or, respectively, retaining position, the measuring system comprising a band or cable element arranged at the ends of the U-shaped bail adapted to engage the passenger on the chair member, a resulting bulging out of the band or cable element allows the necessary latching position to be found.

6. The retaining system as set forth in claim 5, wherein the band or cable element is a self-retracting strap whose drawn out length is employed for the determination of the latching position.

7. The retaining system as set forth in claim 5, wherein the band or cable element is an elastic or non-elastic but movable band or cable whose degree of stretch and/or tension is employed for the determination of the latching position.

8. The retaining system as set forth in claim 1, wherein at least at one end of the U-shaped bail bears a detent element for engaging the latching device and one or more lever linkages or slide guides arranged on the floor in front of the chair member or on the chair member is able to be tilted, the retaining part being constituted by the bail and the latching device.

9. The retaining system as set forth in claim 8, wherein the U-shaped bail is made in two parts, the two parts being connected by a rotary joint with a detent locking action.

10. The retaining system as set forth in claim 8, wherein the bail is secured in position by the intermediary of a rotary joint on the lever linkage or linkages or the latching device by way of a rotary joint on the chair member.

11. The retaining system as set forth in claim 1, wherein one end of the bail has a rotary joint, the latching device being integrated in the rotary joint.

12. The retaining system as set forth in claim 11, wherein an axis of rotation of the rotary joint is perpendicular to a retaining plane.

13. The retaining system as set forth in claim 11, wherein the rotary joint is arranged underneath the chair member and the U-shaped bail is connected by a linkage with the rotary joint, the linkage being located eccentrically in relation to the middle of the chair member and/or the axis of the bail so that the distance of the U-shaped bail from the chair member is changed on tilting.

14. The retaining system as set forth in claim 1, wherein one end of the bail is so connected with a slide by way of a linkage that on sliding the U-shaped bail is changed in its distance from the chair member and passes into a retaining position, the latching device being integrated in the slide and/or a detent element is provided at a second end of the bail for engaging the latching device, the retaining part including the bail and the latching device on the second end of the bail.

15. The retaining system as set forth in claim 1, wherein the latching device comprises a single or multiple part pivoting frame with one or more straps arranged on the frame, the straps engaging the body of the passenger using the chair member in the retaining position and at least a part of the strap or straps constituting the U-shaped bail.

16. The retaining system as set forth in claim 15, wherein additional pivoting arms are arranged on the frame.

17. The retaining system as set forth in claim 1, wherein the retaining device in addition to the U-shaped bail in the pelvic region comprises further a retaining part in the form of a strap.

18. The retaining system as set forth in claim 1, wherein the distance of the U-shaped bail from the chair member and, respectively, the latching positions and the length of the chair member and/or the back rest are so matched to suit each other that in the retaining position it is impossible for the passenger to fall off.

19. The retaining system as set forth in claim 1, wherein the seat and/or the back rest are adapted to match the shape of the body.

20. The retaining system as set forth in claim 1, wherein the retaining device is structured to be latched in various different positions, the different latching positions reducing the permissible amount of movement of a passenger with respect to the width of the chair member and the depth of the chair member with the bail drawn tight.

* * * * *